G. P. WESTENBERGER AND P. E. PARKER.
POULTRY FEEDER.
APPLICATION FILED MAY 23, 1921.
1,404,251. Patented Jan. 24, 1922.
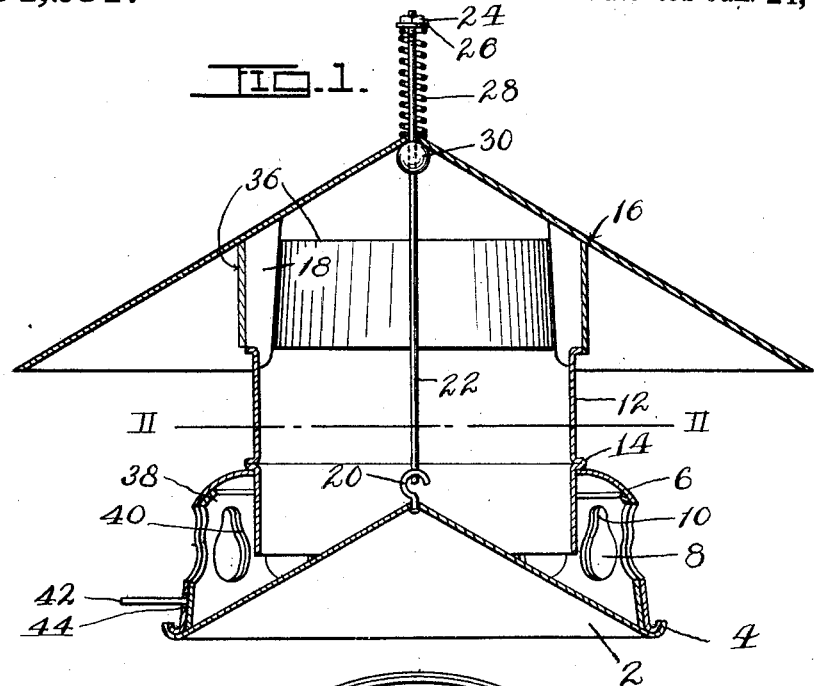
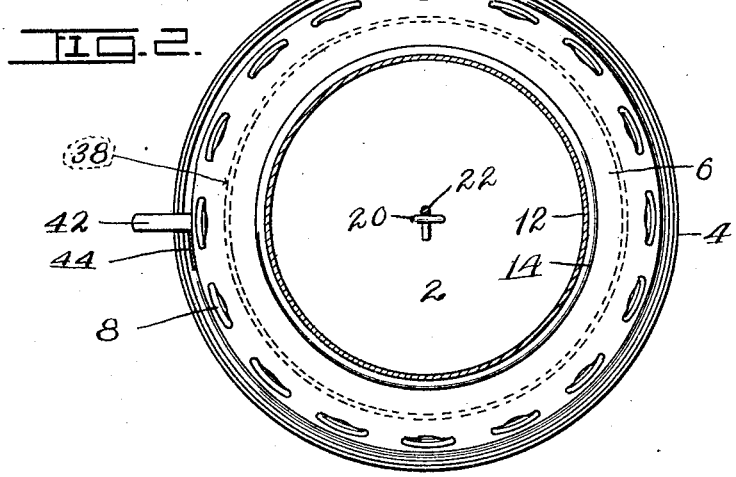
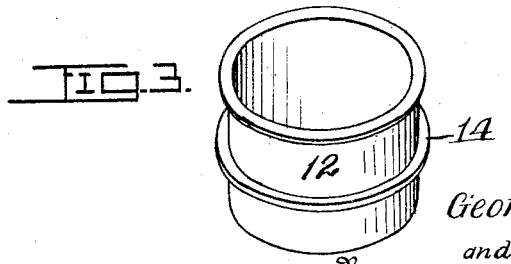
Inventors:
George P. Westenberger.
and Pearl E. Parker.
Witness:
Fred C. Rischer.

UNITED STATES PATENT OFFICE.

GEORGE PETER WESTENBERGER, OF LEAVENWORTH, AND PEARL ELBERT PARKER, OF WINCHESTER, KANSAS.

POULTRY FEEDER.

1,404,251.

Specification of Letters Patent.  Patented Jan. 24, 1922.

Application filed May 23, 1921. Serial No. 471,944.

*To all whom it may concern:*

Be it known that we, GEORGE PETER WESTENBERGER, a citizen of the United States, residing at Leavenworth, in the county of Leavenworth and State of Kansas, and PEARL ELBERT PARKER, a citizen of the United States, residing at Winchester, in the county of Jefferson and State of Kansas, have invented certain new and useful Improvements in Poultry Feeders, of which the following is a specification.

Our invention relates to improvements in poultry feeders and one object is to provide a new and useful device of this character which will permit the poultry to feed freely, but is so constructed and arranged as to prevent the poultry from wasting the feed by scratching or throwing it out upon the ground.

A further object is to provide a device which will afford shelter from rain, snow, etc., to young chicks while feeding and will also protect the feed from moisture and keep it in a wholesome condition until consumed.

Other objects will hereinafter appear and in order that the invention may be fully understood, reference will now be had to the accompanying drawing, in which:

Fig. 1 is a vertical, central, sectional view of our feeder.

Fig. 2 is a cross section on line II—II of Fig. 1.

Fig. 3 is a detail perspective view of a supply chamber employed in carrying out the invention.

Referring now to the different parts disclosed by the drawing, 2 designates a conical pan having an upturned marginal flange 4.

6 designates a circular housing adapted to rest on the pan 2 upon which it is concentrically held by the flange 4. The housing 6 is provided at intervals with openings 8 through which poultry may insert their heads to gain access to the feed in the pan 2. The openings 8 are of only sufficient width to admit the head of a grown chicken, but each has an upward extension 10 to prevent the comb from catching against the upper edge when the chicken withdraws its head.

The upper portion of the housing 6 extends upwardly and inwardly and has a large central opening to receive the annular supply chamber 12, which has a flange 14 intermediate its upper and lower ends to rest upon the top of the housing 6 as shown on Fig. 1. The supply chamber 12 constitutes a magazine for holding feed and extends downwardly close to the pan 2 to regulate the flow of feed thereto. It also reduces the space within the housing 6, so that when fowls insert their heads through the openings 8 they cannot swing their heads sidewise and cast the feed outwardly through the adjacent openings.

The supply chamber 12 is covered by a conical hood 16, which also projects over the housing 6 sufficiently to exclude rain and snow from the openings 8 and provide a shelter for young chicks while feeding. The hood 16 is spaced above the supply chamber 12 by legs 18, which rest on top of said supply chamber.

The pan 2, the housing 6, the supply chamber 12, and the hood 16 are removably held in assembled position by means of hooks 20 and 22, the former of which is fixed to the apex of the pan 2 while the latter extends upwardly through an opening in the apex of the hood 16 and is provided at its upper end with a nut 24 and a washer 26.

A coil spring 28 is interposed between the top of the hood 16 and the washer 26 to exert upward pressure on the hook 22, so that it in turn will pull upwardly on the hook 20 and thus firmly hold the several parts of the feeder together. A ball or other stop 30 is fixed to the hook 22 at a point beneath the hood 16 to limit the upward movement of said hook 22, and it is disengaged from the hook 20 preparatory to taking the feeder apart.

An annular shield 36 and an annular shutter 38 are provided to exclude mice and other rodents from the contents of the feeder at night, or such other times as desired. The shield 36 is fixed to the arms 18 and closes the space between the supply chamber 12 and the hood 16. The shutter 38 is rotatably mounted within the housing 6 and provided with openings 40 and a handle 42, which latter projects outwardly through a slot 44 in said housing 6. By moving the handle 42 in one direction the openings 40 are brought into registration with the openings 8, and by moving said handle 42 in a reverse direction the shutter 38 is moved to a position to close the openings 8.

From the foregoing description it will be readily understood that we have provided a poultry feeder which can be quickly taken apart for shipment or storage in a small space, or readily assembled and set up for use; and while we have shown and described the preferred construction, combination and arrangement of parts, we reserve the right to make such changes as properly fall within the spirit and scope of the appended claim.

Having thus described our invention, what we claim and desire to secure by Letters Patent, is:

A device of the character described consisting of a pan, a housing associated with said pan and having openings therein, a supply chamber associated with said housing, a conical hood associated with said supply chamber, a hook fixed to the pan, a hook associated with the hood and adapted to engage the first hook to hold the parts in assembled position, and a spring associated with the hood and its hook to firmly hold the latter in engagement with the companion hook on the pan.

In testimony whereof I affix my signature in the presence of two witnesses.

GEORGE PETER WESTENBERGER.

Witnesses:
W. P. WETTIG,
JOHN F. SAILLER.

In testimony whereof I affix my signature in the presence of two witnesses.

PEARL ELBERT PARKER.

Witnesses:
F. W. COLEMAN,
J. H. RILEY.